(12) United States Patent
Inskeep

(10) Patent No.: US 10,001,252 B2
(45) Date of Patent: Jun. 19, 2018

(54) EXPANDING MULTI-FACED WORK LIGHT FLASHLIGHT

(71) Applicant: Mathew Inskeep, Highland Beach, FL (US)

(72) Inventor: Mathew Inskeep, Highland Beach, FL (US)

( * ) Notice: Subject to any disclaimer, the term of this patent is extended or adjusted under 35 U.S.C. 154(b) by 0 days. days.

(21) Appl. No.: 15/171,475

(22) Filed: Jun. 2, 2016

(65) Prior Publication Data

US 2016/0356439 A1    Dec. 8, 2016

Related U.S. Application Data

(60) Provisional application No. 62/170,738, filed on Jun. 4, 2015.

(51) Int. Cl.

| *F21L 4/00* | (2006.01) |
| *F21L 13/00* | (2006.01) |
| *F21L 4/04* | (2006.01) |
| *F21L 4/02* | (2006.01) |
| *F21V 14/02* | (2006.01) |
| *F21V 19/02* | (2006.01) |
| *F21V 21/30* | (2006.01) |
| *H05B 33/08* | (2006.01) |
| *F21L 4/08* | (2006.01) |
| *F21V 21/096* | (2006.01) |
| *F21V 23/04* | (2006.01) |

(Continued)

(52) U.S. Cl.
CPC .................. *F21L 4/04* (2013.01); *F21L 4/02* (2013.01); *F21L 4/027* (2013.01); *F21L 4/045* (2013.01); *F21L 4/08* (2013.01); *F21V 14/02* (2013.01); *F21V 14/025* (2013.01); *F21V 19/02* (2013.01); *F21V 21/0965* (2013.01); *F21V 21/30* (2013.01); *F21V 23/0407* (2013.01); *F21V 23/0414* (2013.01); *H02J 7/0052* (2013.01); *H05B 33/08* (2013.01); *H05B 33/0806* (2013.01); *F21Y 2101/00* (2013.01); *F21Y 2115/10* (2016.08); *H02J 2007/0062* (2013.01)

(58) Field of Classification Search
CPC ... F21L 4/005; F21L 4/02; F21L 4/022; F21L 4/027; F21L 4/04; F21L 4/045; F21L 4/08; F21L 4/085; F21V 14/02; F21V 14/025; F21V 21/26; F21V 21/28; F21V 21/29

See application file for complete search history.

(56) References Cited

U.S. PATENT DOCUMENTS

| 6,132,071 A | * | 10/2000 | Yuen | ......................... F21L 2/00 |
| | | | | 362/184 |
| 2005/0030737 A1 | * | 2/2005 | Chen | ....................... B60Q 7/00 |
| | | | | 362/102 |

(Continued)

*Primary Examiner* — Alexander Garlen
(74) *Attorney, Agent, or Firm* — Daniel S. Polley, P.A.

(57) ABSTRACT

A combination flash light and work light. The device can also be provided with a USB receptacle port for electrically connecting a cable to recharge the internal battery or using the internal battery to charge another electronic device. A plurality of light array panels can be pivotally secured to the main light unit. The main light head can also pivot with respect to the rest of housing where the electrical circuits and components are housed. A relatively large or wide base can be provided at a bottom end to allow the device to be freestanding. A magnet and/or hook can be provided at the base to permit the device to be hung to an object or secured to a metallic surface.

18 Claims, 8 Drawing Sheets

(51) Int. Cl.
*H02J 7/00* (2006.01)
*F21Y 101/00* (2016.01)
*F21Y 115/10* (2016.01)

(56) References Cited

U.S. PATENT DOCUMENTS

| | | | | |
|---|---|---|---|---|
| 2006/0109662 A1* | 5/2006 | Reiff | F21L 4/04 | 362/373 |
| 2006/0139927 A1* | 6/2006 | Kovacik | F21V 29/74 | 362/260 |
| 2009/0135611 A1* | 5/2009 | Lin | F21L 4/00 | 362/372 |
| 2010/0039801 A1* | 2/2010 | Pelletier | F21L 2/00 | 362/184 |
| 2010/0232147 A1* | 9/2010 | Bryant | F21L 4/08 | 362/183 |
| 2010/0320839 A1* | 12/2010 | Walter | H02M 3/1582 | 307/43 |
| 2012/0224358 A1* | 9/2012 | Noble | F21L 4/027 | 362/158 |
| 2013/0128565 A1* | 5/2013 | Cugini | F21V 21/145 | 362/184 |
| 2013/0343042 A1* | 12/2013 | Windom | F21L 4/08 | 362/183 |
| 2015/0003050 A1* | 1/2015 | Parsons | F21L 4/005 | 362/158 |
| 2015/0267902 A1* | 9/2015 | Zhang | F21L 4/04 | 362/188 |

* cited by examiner

EXPANDING MULTI-FACED WORK LIGHT FLASHLIGHT

This application claims the benefit of and priority to U.S. Provisional Patent Application Ser. No. 62/170,738, filed Jun. 4, 2015, which is incorporated by reference in its entirety for all purposes.

FIELD OF THE DISCLOSURE

The disclosure generally relates to the field of portable lighting devices and particularly to handheld flashlights and work lights.

BACKGROUND

Typically flashlights are portable handheld devices providing a single beam of light out of one end of its housing. Providing the single beam of light is usually the sole purpose of the flashlight. The flashlight is commonly powered by one or more batteries that have to be replaced once they become dead from use over time. The present disclosure is addressed to reducing or eliminating the problems and/or limitations found with conventional flashlights.

SUMMARY OF THE DISCLOSURE

Generally, disclosed is a combination lighting device comprising a flashlight and work light, preferably provided with one or more expanding illuminated panels. When in a fully expanded configuration the panels can be in a perpendicular or substantially perpendicular orientation with respect to the elongated housing/body of the lighting device such that when the lighting device is standing upright (vertical), the panels in their fully expanded configuration can be in a horizontal or substantially horizontal position. In operation as a flashlight, the flashlight can be held in a user's hand. The work light component provides area lighting and can stand on its own via a stand or base, can be hung through a pivoting hook preferably provided at the base or otherwise connected to another object, such as, but not limited to, through a magnet also preferably provided at the base.

Thus, the combination lighting device provides for a hand held light and a free standing light. The combination lighting device includes a flexible/pivotable/rotatable head component which houses the main light as well as serving as the physical pivotable connection points for the multiple moveable LED array panels around the main light. When the main light is at its high setting and the LED panels are energized (turned on), the combination lighting device is considered to be providing its maximum light output. Additional non-limiting features for the combination lighting device can include one or more of the following: a universal serial bus, a magnet (i.e. rare-earth magnet, etc.) at the base of the unit, and/or a hanging hook also preferably located at the base of the unit. The combination lighting device can be powered by multiple internal battery cells and individual power driving circuits. In use, the combination lighting device allows or enables a user to maximize the utility of the light unit by controlling the amount of lights energized (i.e. main central light, LED panel(s) or both), the orientation of the main light housing with respect to the remaining housing portion of the lighting device, and the orientation of the LED array panels with respect to the main light housing, in addition for allowing hands free usage (through free standing upright, magnet securement and/or hook securement), combined with internal energy to power or recharge small personal electronic devices.

DETAILED DESCRIPTION

Figure 1:
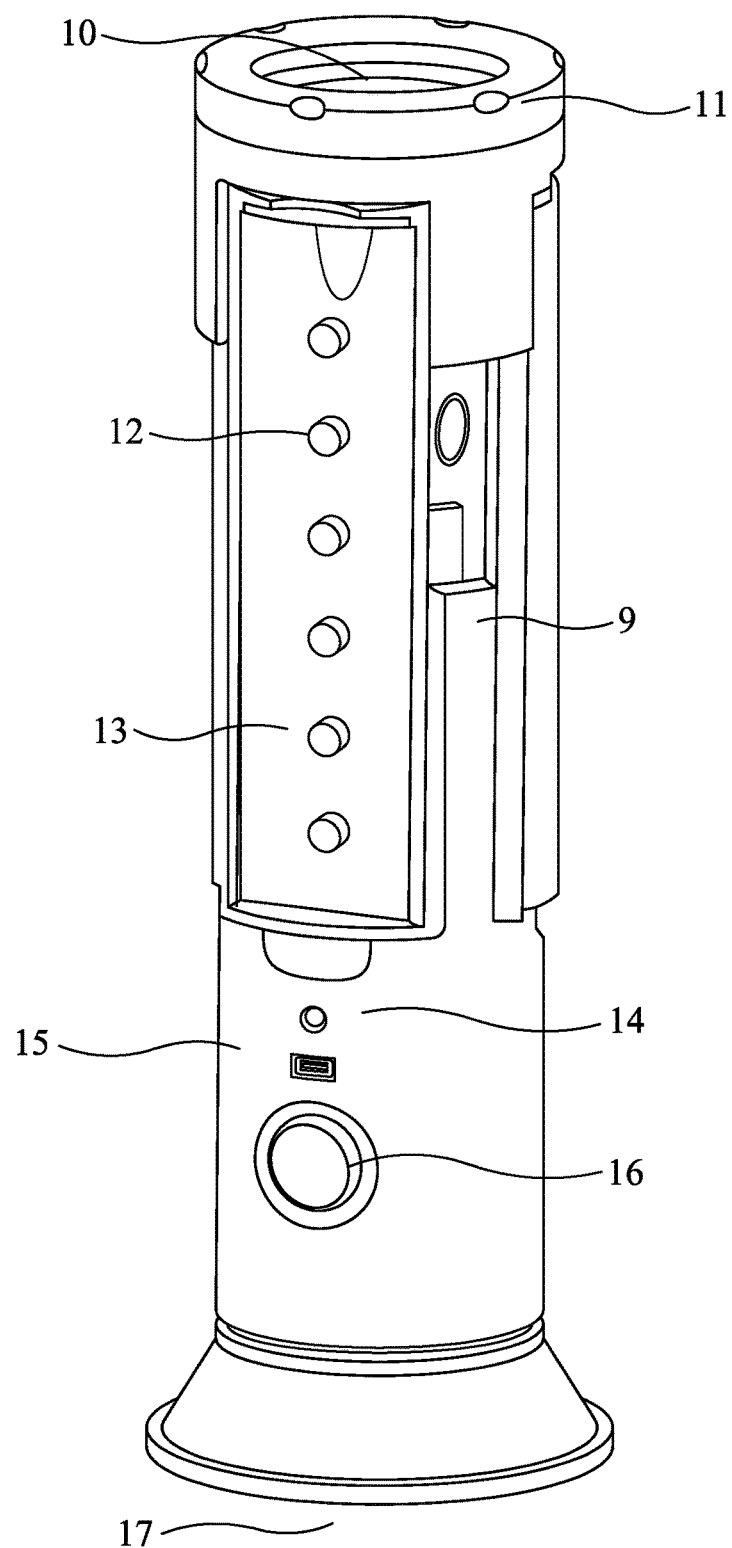
FIG. 1 is a perspective free standing view of the combination lighting device in accordance with a first embodiment of the disclosure and illustrating the main components of the combination lighting device with the plurality of light panels in a retracted position.
Figure 5:
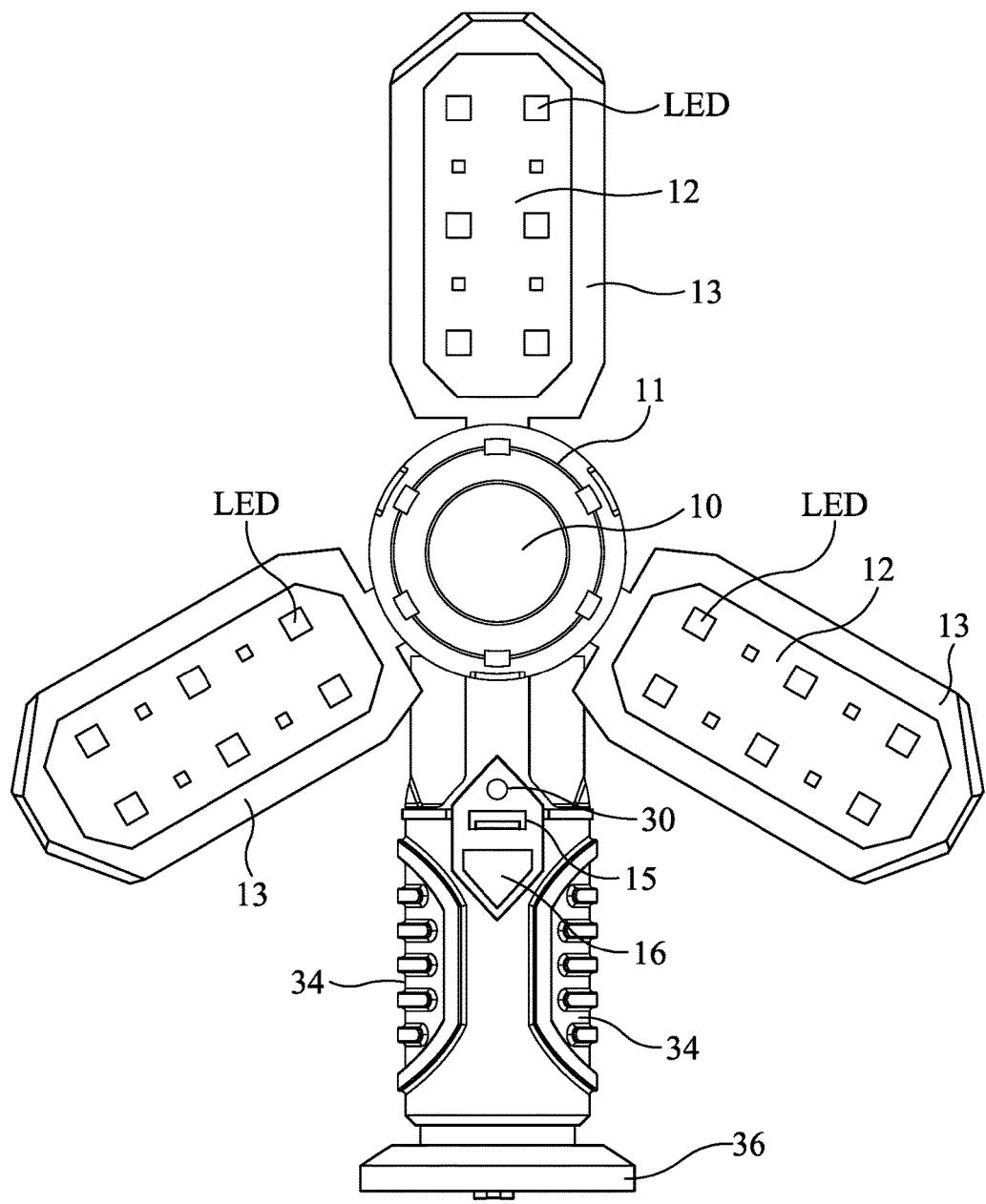
FIG. 5 is a front perspective view of a second embodiment for the combination lighting device and illustrating the plurality of light panels in a fully expanded/extended position and the main light head/housing fully pivoted to an approximately perpendicular angular position with respect to a remainder of the lighting device housing.

As seen in the drawings, a combination lighting device is shown which provides multiple lighting sources and allows for various orientations and/or configurations for the light sources. The combination lighting device can act as both a work light that can be operated hands-free and as a handheld flashlight. The combination lighting device comprises a main light unit 10 (which in an unpivoted position is located where a typical light element of a conventional flashlight is found) housed within a head or flexible head portion 11 and a plurality of light panel bodies 13 (each housing a light array 12a, 12b or 12c) connected to the main light head portion 11 preferably at equal distances from each other and such that main light 10/head portion 11 can be preferably centrally located with respect to the connection locations of light panel bodies 13 and regardless of the pivot position of head portion 11 with respect to the rest of the housing of the lighting device. Each light panel can be preferably provided with an array of built in light emitting diodes (LEDs). As seen in FIG. 1, the array can be a single row of LED bulbs or as seen in FIG. 5 the array can comprise multiple rows of LED bulbs, such as, but not limited to, two rows of LED bulbs.

Figure 3B:
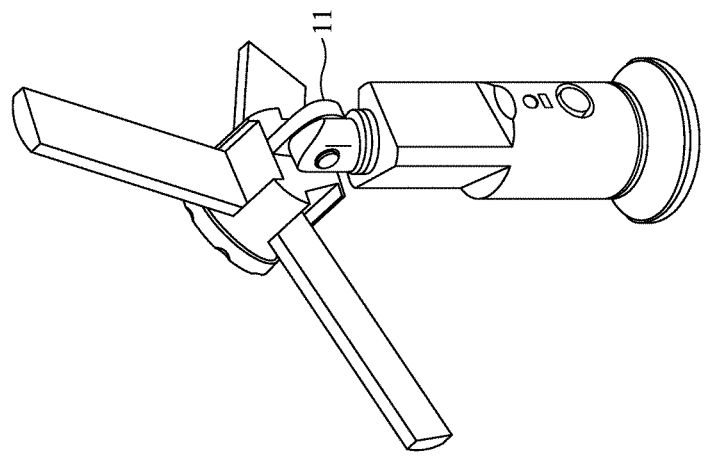
FIG. 3b is a second top perspective view of the combination lighting device of FIG. 1 and illustrating the plurality of light panels in a fully expanded/extended position and the main light head/housing pivoted to an angular position with respect to a remainder of the lighting device housing.
Figure 3A:
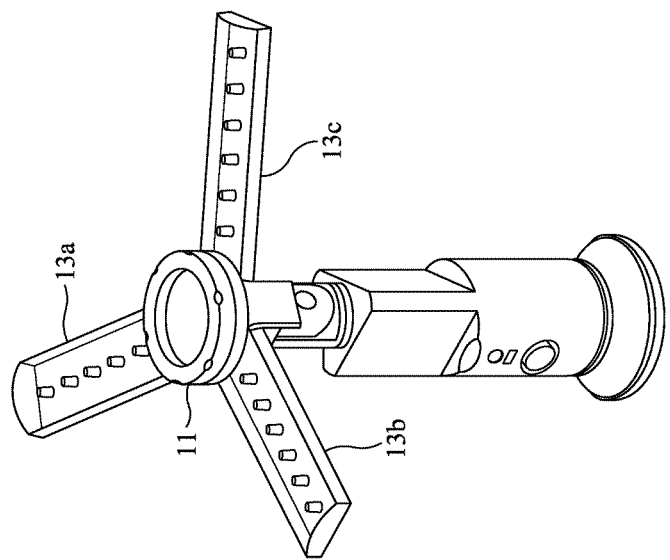
FIG. 3a is a first top perspective view of the combination lighting device of FIG. 1 and illustrating the plurality of light panels in a fully expanded/extended position.
Figure 4:
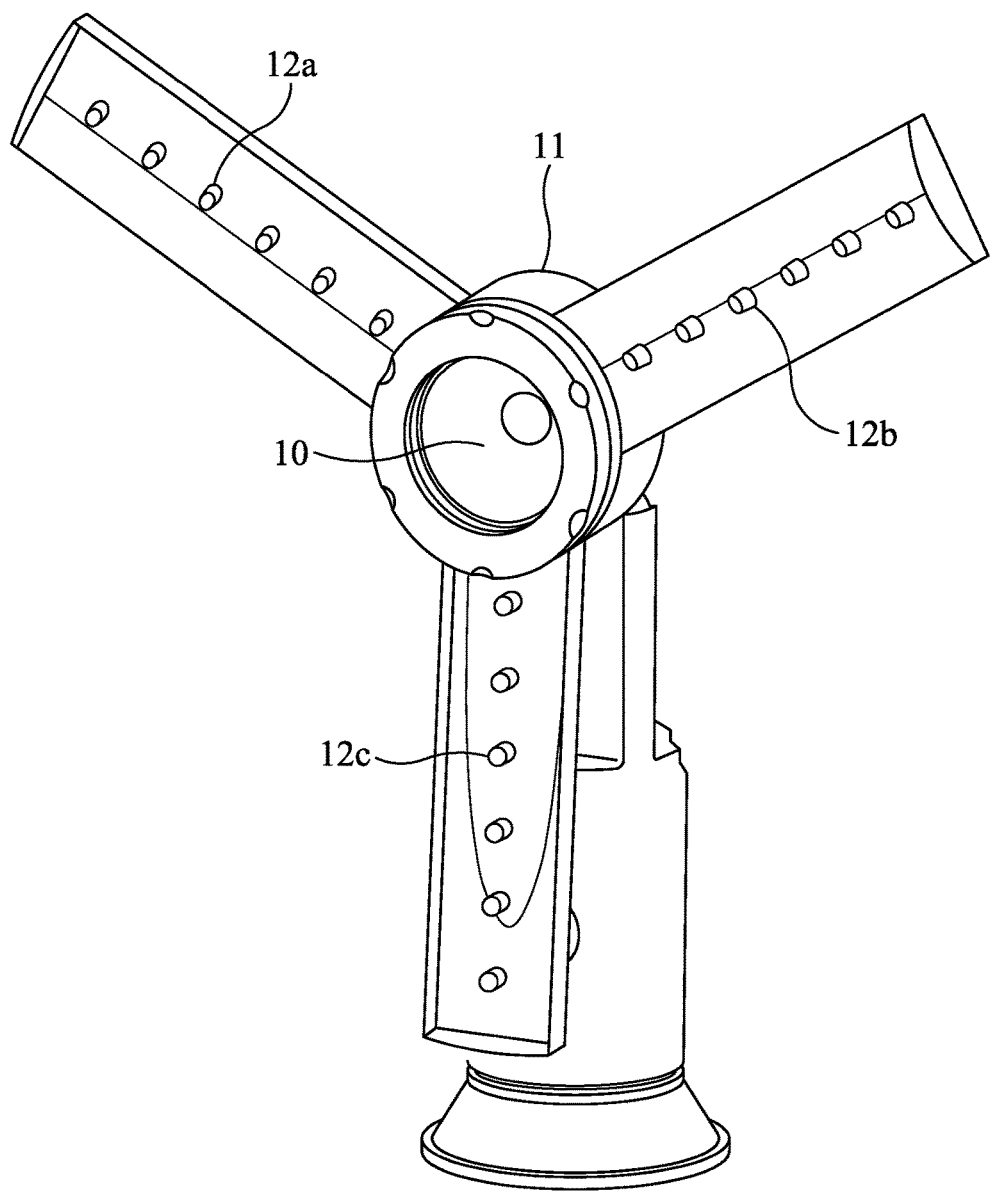
FIG. 4 is a front perspective view of the combination lighting device of FIG. 1 and illustrating the plurality of light panels in a fully expanded/extended position and the main light head/housing fully pivoted to an approximately perpendicular angular position with respect to a remainder of the lighting device housing.

Additionally, each panel can be oriented in a vertical position (See FIG. 4) as well as a horizontal position (See FIG. 3a) by expanding the panels outward and tilting/rotating the main light head portion 11 to its vertical position (for vertical panel orientation) or its horizontal position (for horizontal panel position). For the vertical position, main light unit can be rotated 90 degrees or approximately 90 degrees with respect to the remaining portion of the housing of the lighting device. For the horizontal position, main light unit 10/head portion 11 can be preferably in an unpivoted position similar to the location of the light element of a conventional flashlight.

The connection of main light head portion 11 to the remaining portion of the light housing can be made by a single side pivot mechanism such that the main light head portion 11 can be rotated/pivoted 90 degrees or approximately 90 degrees in either direction from its horizontal position or designed to rotate/pivot 90 degrees or approximately 90 degrees in only one direction from its horizontal position. Additionally, the single side pivot mechanism can be provided with various internal stops/catches (detent positioning) which can allow main light head portion 11 to be pivoted and maintained at one of several angular positions with respect to the remaining portion of the light housing between its vertical position and its horizontal position. With the detent or similar mechanism provided, incremental/positional adjustments can be made to the position of the main light head portion 11 between its vertical and horizontal direction in either direction.

Thus, the various orientations of the main light head portion 11 in turn provide for various orientations of the plurality of light panels, in addition to their above-noted horizontal and vertical position. Furthermore, the pivot connections between the light panel bodies 13 to the main light head portion 11 can also permit the panels to be pivoted to and maintained at one of several partially extended positions (i.e. not fully extended). Also, each light panel body 13 can be extended out at different angles (with respect to the main light head portion 11) from the other panel bodies 13 (i.e. the panels do not all have to extend out to the same orientation as they are preferably each separately connected to the main light head portion 11 independent of the other panels connections). The panel bodies 13 can each be individually moved and expanded to maximize the total area of illumination. Panel bodies 13 accommodate and house an array 12 of several LED lights aligned through the center of each panel (FIG. 1) or a plurality of rows of LED lights (FIG. 5). Accordingly each of the panel bodies 13 with their array of lights 12, can be arranged in multiple angles so that the light from light panel arrays 12 can illuminate in various directions. As seen in FIG. 1, panel bodies 13 are collapsible (i.e. folded/pivoted down so that they are virtually parallel and flush to the handle (i.e. elongated portion of enclosure 9), while also concealing the single side pivot mechanism used for rotating main light head portion 11.

Main light head portion 11 houses main light 10 and reflector, with main light 10 also serving as a light source. Main light 10 can be a LED light mounted preferably in the center (See FIG. 4), though such is not considered limiting and another type of light bulb can be used and considered with the scope of the disclosure. Additionally, main light 10 can also comprise a plurality of LED or other types of light bulbs and such configurations are also considered within the scope of the disclosure. As seen in FIG. 3, one benefit and utility of the combination lighting device is its capability to provide a light source with multiple light outputs. The integrated features make the combination lighting device a multi-functional device provided in a single useful compact design.

Figure 6:
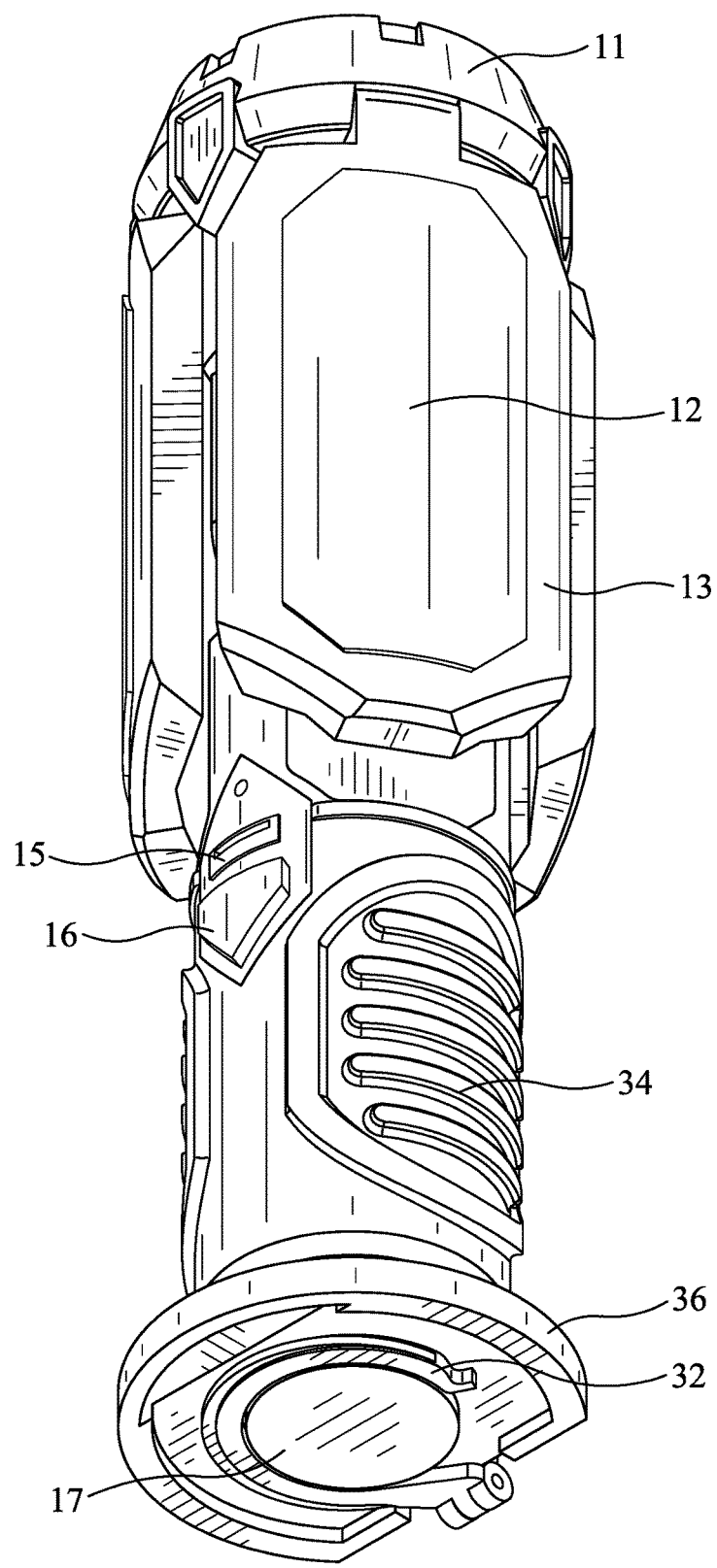
FIG. 6 is a bottom perspective view of the second embodiment for the combination lighting device and illustrating the magnet and hook in a retracted position.

FIG. 1 illustrates a first embodiment of the combination lighting device showing the plurality of light panels in their retracted position with respect to the housing or enclosure 9 of the combination lighting device. Preferably the base of the enclosure 9 can be wider in diameter/dimensions then an elongated portion of enclosure, which provides a stable resting surface of positioning the combination lighting device in a free standing upwards position. Various shapes can be used for the base portion of enclosure 9, it is preferred that the base be circular or semi-circular in shape, though such is not considered limiting. Enclosure 9 can be constructed from various materials and in a preferred embodiment, enclosure 9 can be constructed from a light weight, polymeric material. Preferably, the elongated portion can be cylindrical in shape, though such is not considered limiting. In one non-limiting embodiment, the elongated portion of enclosure 9 can measure approximately eight inches in length and about four inches in width/diameter. The combination lighting device can be used as a hand held device or standalone (i.e. resting upright through its larger base portion). Additionally, combination lighting device can also be attached to a metal surface through a magnetic connection with a magnet 17 preferably located at the base of the unit (See FIG. 6). In one non-limiting embodiment, magnet 17 can be a rare-earth magnet. The magnetic retaining feature can be useful particularly when performing work where a hands free operation is preferred or needed. The combination lighting device can be held by grabbing the elongated portion of enclosure 9, allowing a user to use it as a hand held flashlight. Preferably, at least a portion of the elongated portion can be provided with grips or a gripping surface, such as, but not limited, to ergonomic rubber grips 34 (See FIG. 6).

The present invention integrates electrical features that can be actuated by a momentary push power button 16. When momentarily pushed down, the power button sends a signal to the internal control circuit to power the light unit internal circuitry such as the universal serial bus 15, or the led panels array 12 and/or the main light 10 of the device.

Figure 2:
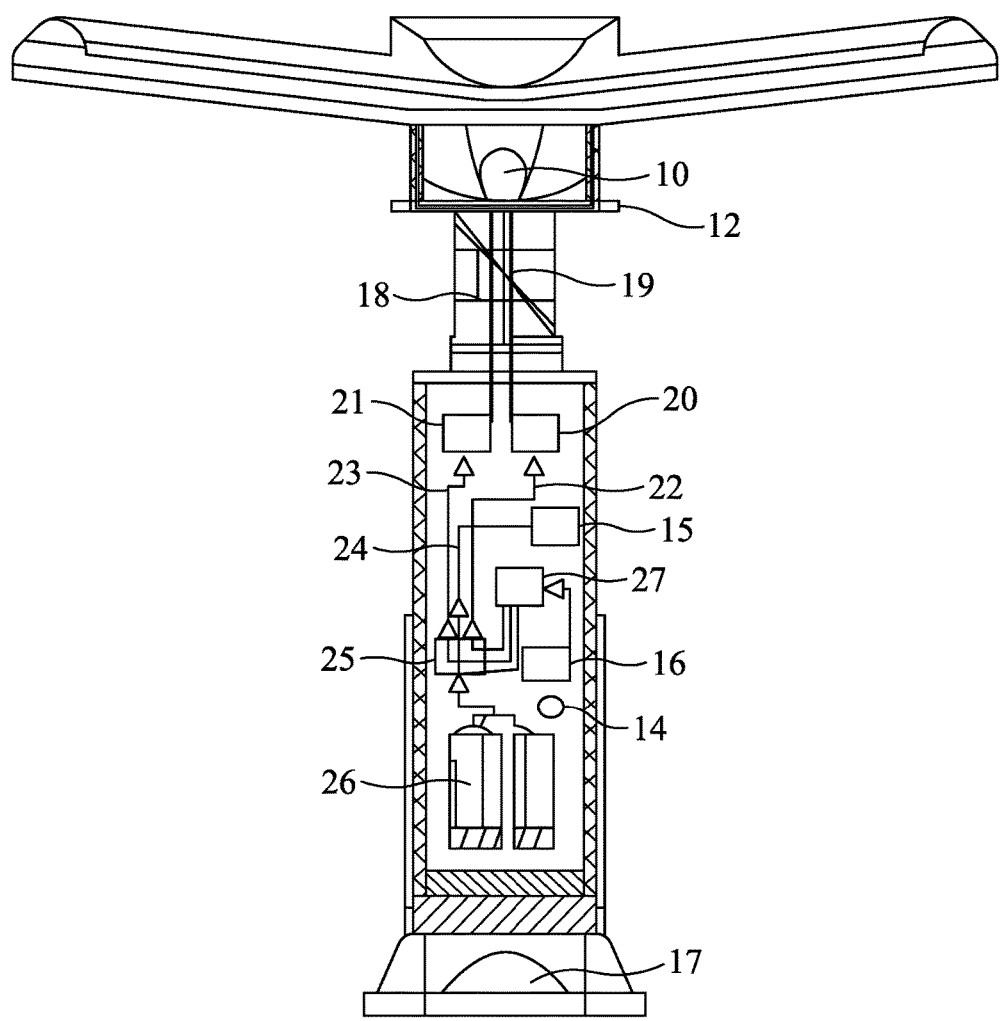
FIG. 2 is a sectional view of the combination lighting device of FIG. 1 illustrating an internal block diagram of the electrical construction/components for the combination lighting device and illustrating the plurality of light panels in a fully expanded/extended position.

FIG. 2 illustrates a block diagram of the preferred embodiment for the internal electrical components used for operating the combination lighting device. Combination lighting device can be powered by an internal energy source 26, which can comprise one or more battery cells providing the necessary voltage and energy to drive the various built-in features of the combination lighting device described above and below. The electric current between energy source 26 and each of the internal features can be transferred using various circuits designed to output the proper voltage and current to each individual component. Preferably, the internal electrical components and energy source(s) 26 are housed or otherwise contained within enclosure 9.

Initially, the lighting device can become activated when the momentary power push button 16 is pressed down. The power button 16 can also serve as a selector button to activate the built-in features inside the light unit. The power button 16, when initially activated, preferably sends a high pulse to the microcontroller 27, indicating the desired mode of operation. The width of the high pulse is only momentary in order to command the microcontroller to change mode sequence and move into the next option; otherwise, this pulse will always remain in an active low position. The pulse can be described as a logic binary signal. The microcontroller 27 will be programed to look for this active high pulse before moving between sequences. Once this pulse is received, the microcontroller will send a command to the multiplex unit 25 to activate the corresponding circuit. The multiplex unit 25 controls the internal drive circuits.

The microcontroller can also be programmed such that, from an off position, upon pressing button 16 once, main unit light 10 can be illuminated/energized in a high output mode. Upon pressing button 16 again, main unit light can be illuminated/energized in a low output mode (i.e. less brighter than the high output mode). Upon pressing button 16 again, the main unit light 10 is no longer illuminated and the light arrays 12 housed within the panel bodies 13 are illuminated (preferably all at the same time, though it is within the scope of the disclosure to program the microcontroller such that one array 12 is initially illuminate and subsequent pressing of button 16 causes another array 12 to illuminate). Upon pressing button 16 again, the main unit light 10 can be illuminated/energized (preferably in high output mode—though it is within the scope of the disclosure to illuminate the main unit light 10 in the low output mode) while maintaining the illumination of the light arrays 12 (i.e. all light sources are illuminated at the same time). Pressing button 16 again causes all lights to go off (no longer energized by internal drive circuits). Other combinations, sequences, patterns and/or order of illuminations of the various light sources can also be used and the microcontroller programmed accordingly and all are considered within the scope of the disclosure. Additionally, at any time microcontroller 27 can be programmed to recognize a user pressing and holding down button 16 for a predetermined/preprogrammed amount of time (e.g. 3, seconds, 5 seconds, 10 seconds, etc.) to cause all or some of the lights to flash. Pressing button 16 a second time will cause microcontroller to turn off the flash mode.

As seen in FIG. 2, a first drive circuit 15 can be provided for driving/energizing the universal serial bus ("USB"). A second or main line drive circuit 21 can be provided for driving/energizing main light unit 10 and a third drive circuit 20 can be provided for driving/energizing the multiple panel light arrays 12, preferably comprising a plurality of LEDs. Multiplex unit 25 can exist as part of the microcontroller or as a separate circuit in which it consists of a system that will be distributing simultaneously the proper voltage and current to power each independent feature (USB, main light unit 10, panel light arrays 12) as previously described.

In another non-limiting sequence, the first pulse logic sequence can be to power the main LED light 10. In this scenario, the first pulse to microcontroller 27 can send the command to the multiplex unit to activate main light unit 10, by allowing energy to flow from energy source 26 through driving circuit 21 associated with main light unit 10. Preferably simultaneously, though not considered limiting, a command will also be issued by the microcontroller to the multiplex unit for the multiplex to power the universal serial bus circuit 15. Though not considered limiting, in a preferred design, the universal serial bus circuit can remain in an active (energized) position (state) until the combination lighting device is completely powered down. In other words, the USB feature is active all the time except when the unit is powered down. The utility of the USB output receptacle is to provide charging means for rechargeable electronic devices, such as, but not limited to small consumer electronic devices. However, it is also within the scope of the disclosure to be able to activate the USB output receptacle independent of the activation of one or more of the light sources (i.e. without any light sources being on), to allow the USB output receptacle to charge the electronic device while not unnecessarily draining the energy source/battery if a light source is not currently needed.

The USB output receptacle can be designed, operate and function similar to the USB output receptacle described and disclosed in my co-pending application (U.S. application Ser. No. 14/321,895, filed Jul. 2, 2014, entitled HIGH POWER RECHARGEABLE FLASHLIGHT WITH TWO-WAY UNIVERSAL SERIAL BUS), which disclosure and drawings are incorporated by reference in its entirety. Thus, the USB output receptacle, when active, provides for a power-in/power-out USB charging feature. As a two-way USB receptacle 15, receptacle 15 can be used for charging internal energy source 26 (i.e. preferably one or more rechargeable batteries) through a USB cord/cable plugged in at an opposite end to a source of energy (i.e. outlet, computer USB, etc.) and for charging consumer electronics also through USB cord/cable plugged in at an opposite end to the consumer electronic (e.g. smartphone, cellphone, camera, speaker, tablet, etc.). Thus, depending on its use, power can either received by the combination lighting device through USB receptacle 15 for recharging energy source 26 or power is delivered out of USB receptacle 15 from energy source 26 to plugged-in electronic device for charging the electronic device by the combination lighting device.

The secondary pulse in this another non-limiting sequence, when received by microcontroller 27, via the pressing of momentary power button 16, can command multiplex unit 25 to shut down main light unit driver circuit 21 (i.e. turning off main light 10) and instead power up driver circuit 20 associated with the one or more light array panels 12. This will allow energy to flow from energy source 26 to preferably all light LED panel arrays, as seen on FIGS. 4 (12a, 12b and 12c). Preferably, driver circuit 20 can be configured such that it provides the power needed for energizing all of the light panel arrays 12 provided with the combination lighting device. As previously mentioned and as seen in the Figures, in a preferred embodiment each light panel array 12 comprises or contains multiple LED panel arrays that are preferably located around the light unit. FIGS. 3a, 3b, 4 and 5 depicts the combination lighting device with the LED panel array bodies 13 in their fully extended position (but with main light unit body 11 being in different positions in these Figures).

The third pulse to microcontroller 27 in this another non-limiting sequence, can activate all functions simultaneously for a complete operation of the light unit. Maximum energy consumption is consumed during this time, as such; microcontroller 27 can be programmed to monitor the battery level and energy consumed by the light unit and can be programmed to initiate a shut-down procedure/instruction when power is depleted but not at zero percent (i.e. a predetermined/preprogrammed percentage of remaining battery power—e.g. 5%, 10%, etc.). By shutting down prior to fully draining the battery, some energy still remains for safety circuit devices.

Figure 7:
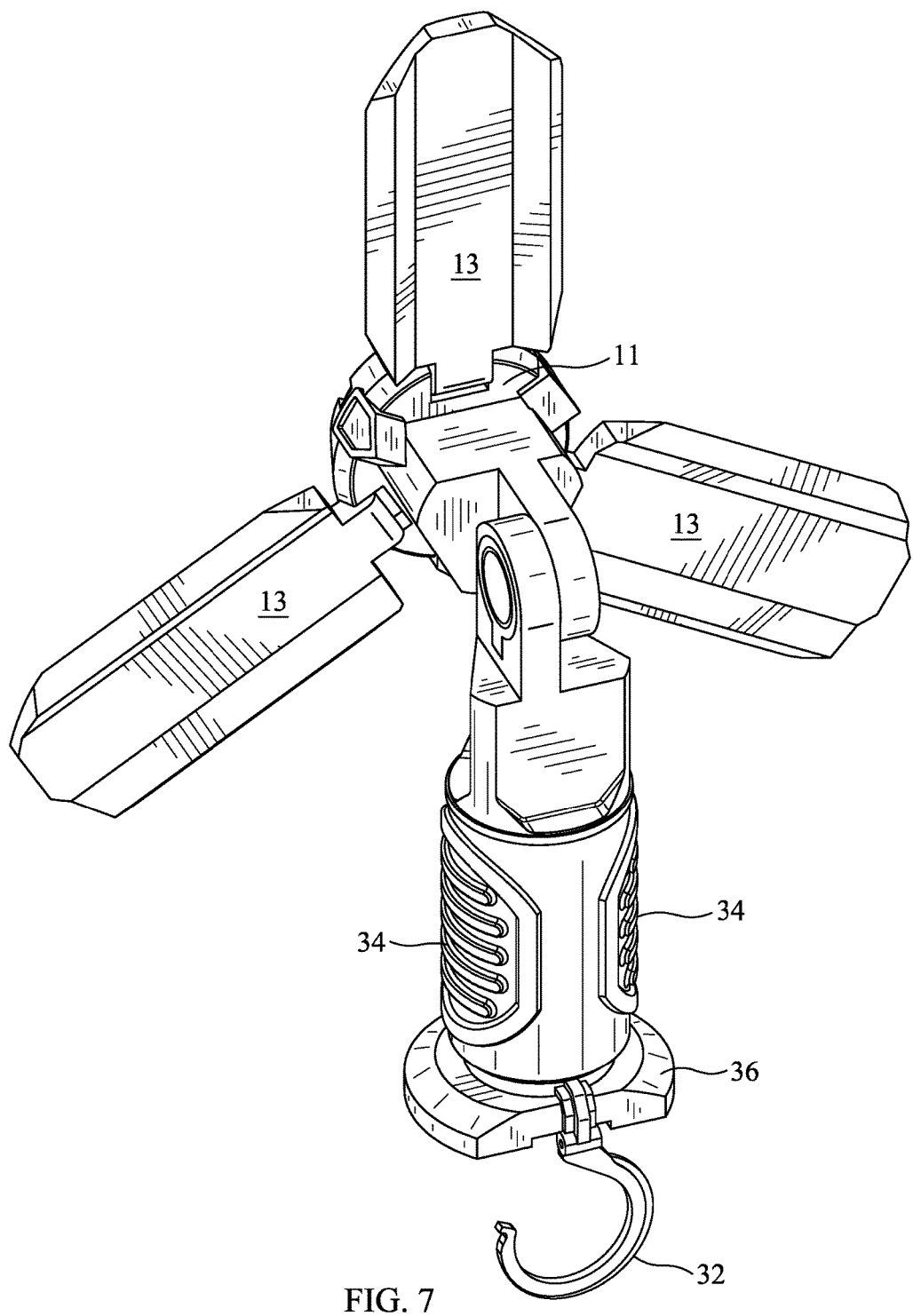
FIG. 7 is back perspective view of the second embodiment for the combination lighting device and illustrating the hanging hook in an extended "ready for use" position.
Figure 8:
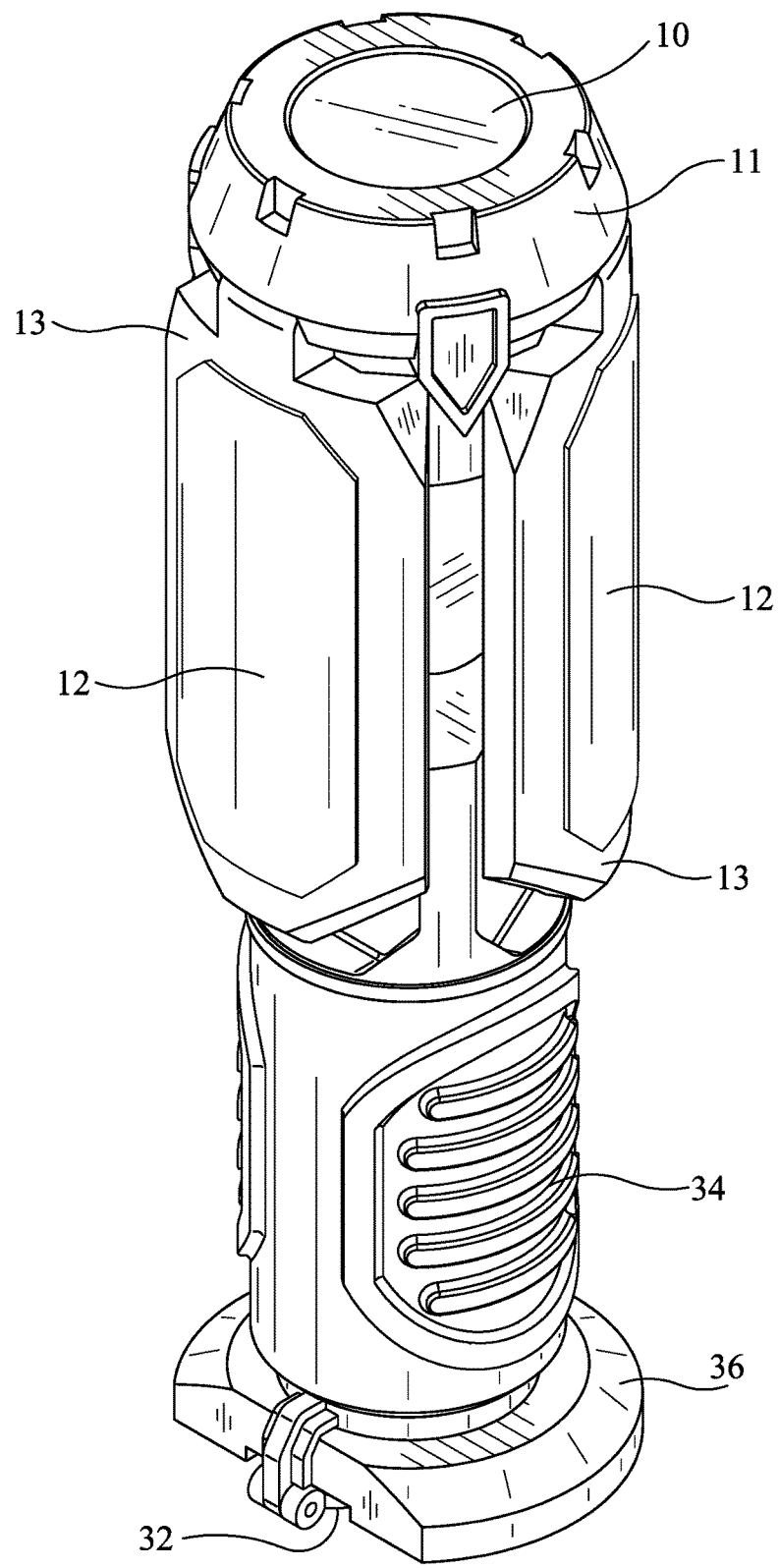
FIG. 8 is a back perspective view of the second embodiment for the combination lighting device and illustrating the plurality of light panel bodies in a collapsed position.

All of the components described herein can preferably work in harmony together to produce a desired outcome, which is to produce a comfortable and easy-to-use multi illumination light unit. Power button 16 preferably serves as a mode button. The combination light unit can be used as both a work light and/or a flashlight. In one use as a work light, the combination lighting device, in addition to being free standing, can also be hung from a surface using the hook of FIG. 7 or can be stuck to a magnetic surface using its magnetic base (i.e. rare-earth magnet 17). In one use as a flashlight, the combination lighting device (preferably with the light panel bodies 13 fully collapsed) can be used as a hand held light in a traditional flashlight manner (see FIGS. 6 and 8).

The magnetic base or magnet 17 within base 36 and folding hanging hook 36 allow the user to position the combination lighting device for convenient, hands-free operation. In use for hanging the lighting device, the hook can be preferably folded to its about 90 degree in-use/open position (see FIG. 7). To use the magnetic base or magnet 17 within base 36 to secure the lighting device to a metallic surface, hook 32 can be folded or maintained in its storage/stow-away recessed position (see FIG. 6). Preferably the diameter of the hook is chosen such that magnet 17 is disposed within the hook area which permits for a compact area within base 36 for housing magnet 17 and hanging hook 32.

Though not considered limiting, USB port 15 can provide 5 volts/1 Amp of DC power to an external USB powered device. Microcontroller 27 can be programmed to automatically shut down USB port 15 if it detects that there is no USB output power for a predetermined period of time (e.g. 10 seconds, 20 seconds, etc.). The user can also turn off power to USB port 15 by pressing the second button again after the USB port 15 has been turned on.

DRAWINGS NUMBERING

| 9. | Light unit enclosure | 10. | Main light & reflector |
|---|---|---|---|
| 11. | Flexible light head | 12. | Panel array led |
| 12a. | Panel array 1 | 12b. | Panel array 2 |
| 12c. | Panel array 3 | 13. | Panel body |
| 13a. | Panel body 1 | 13b. | Panel body 2 |
| 13c. | Panel body 3 | 14. | Power Indicator |
| 15. | USB receptacle | 16. | Power Button |
| 17. | Rare-earth magnet | 18. | Panel array led power line |
| 19. | Main light led power line | 20. | Panel array driving circuit |
| 21. | Main light driving circuit | 22. | Panel array driving circuit power line |
| 23. | Main light driving circuit power line | 24. | USB power line |
| 25. | Multiplex unit | 26. | Battery cells compartment |
| 27. | Microcontroller | 30. | Second power button |
| 32. | Hanging hook | 34. | Grips |
| 36. | Base | | |

Preferably, when the light panel bodies 13 are in their collapsed position, access to the USB receptacle 15 and power button 16 is unobstructed. Additionally, as seen in FIG. 5, when main light head housing/body 11 is rotated to a vertical orientation and the light panel bodies 13 are extended fully outward, easy access to USB receptacle 15 and power button 16 is still provided as USB receptacle 15 and power button 16 are disposed between the locations of the two adjacent light panel bodies 13. Additionally, light panel bodies 13 in this extended and rotated position also do not interfere with the user's ability to grab the elongated portion of enclosure 9 at the gripping area (i.e. grips). Furthermore, all other main light head body 11 and/or light panel bodies 13 position configurations or combinations also preferably do not interfere with the user's ability to easily grip/hold the combination lighting device and access USB receptacle 15 and power button 16.

In one non-limiting embodiment, energy source 26 can be one or more lithium-ion batteries.

As best seen in FIGS. 1 and 5, a power indicator light 14 and/or indicator button/light can be provided and in in electrical communication with the above described circuitry/electrical components. Light 14 serves as a battery charge status indicator (i.e. LED indicator). Microcontroller 27 can be programmed to illuminate light 14 when the charge of energy source 26 reaches a predetermined low level. Alternatively, for the embodiment shown in FIG. 5, an indicator button can be pressed and the associated light (i.e. LED, etc.) illuminates and/or flashes a particular color (e.g. red, green, blue, etc.) to indicate a certain predefined charge level status. Alternatively or in addition to charge level status indicator, this second button (separate from power button 16) can serve as a separate power button for energizing/activating USB receptacle 15 (i.e. separate and/or independent from illuminating main light 10 and/or light panel arrays 12). Where second button 30 is provided (See FIG. 5), power button 16 can be used for turning main light 10 and/or light panel arrays 12 on and off and in particular sequences/order/light modes and preferably is not used for activating USB receptacle 15 (though the electrical components can also be configured that USB receptacle 15 is activated by second USB dedicated button 30 and/or turning on one of the lights of the combination lighting device).

In one non-limiting color scheme embodiment, light 14 or the light associated with a second button 30 (FIG. 5) when button 16 or 30 is pressed (or independent of pressing the button) can indicate the following: when charging: blue (solid) to indicate the battery is in a fully charged stated, blue (flashing) to indicate that the battery is in a partially charged states and red (flashing) to indicate that the battery needs charging. When the USB receptacle/port is being used and preferably with the second USB power button being pressed, the light can indicate the following: blue (solid) to indicate that the battery is operating at or near full voltage; red (solid) to indicate that the battery is operating at partial voltage, red (flashing) to indicate that the battery is operating at extremely low voltage. As mentioned above, when microcontroller 27 determines that the battery is operating at the predefined extremely low voltage point, microcontroller 27 can initiate/activate the built-in (preprogrammed) voltage protection and the combination lighting device to automatically shut down.

Unless specifically claimed in one or more patent claims, the combination lighting device is not considered limited to any particular number of LEDs for each light panel or main light unit, nor is it considered limited to any particular number of light panels. Additionally, the type of magnet used is also not considered limited. Furthermore, features of one embodiment can be used and/or incorporated into other embodiments for the combination lighting device. As seen in FIGS. 1 and 5, in one non-limiting embodiment six LED light bulbs can be used for each light panel 12 (either as a single row—FIG. 1 or two rows—FIG. 5).

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from their spirit and scope.

All components of the described combination lighting device and their locations, electronic communication methods between the system components, wiring, pivot mechanisms, attachment or securement mechanisms, dimensions, values, shapes, etc. discussed above or shown in the drawings, if any, are merely by way of example and are not considered limiting and other component(s) and their locations, electronic communication methods, pivot mechanisms, attachment or securement mechanisms, dimensions, values, shapes, etc. can be chosen and used and all are considered within the scope of the disclosure.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

The benefits, advantages, solutions to problems, and any element(s) that may cause any benefit, advantage, or solution to occur or become more pronounced are not to be construed as a critical, required, or essential features or elements of any or all the claims.

While the combination lighting device has been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. A combination lighting device comprising,
a main light;
a main light head housing the main light;
a plurality of light arrays;
at least three light panel bodies equally spaced from one another around the main light head housing, each of the at least three light panel bodies pivotally secured to the main light head housing, each of the plurality of light arrays housed within an associated one of the at least three light panel bodies, wherein when each of the at least three light panel bodies is pivoted outward to a fully extended position with respect to the main light head housing light each of the plurality of light arrays faces and emits light in the same direction as the main light housed by the main light head; an elongated housing having a first end and an opposite second end and being separate from the main light head housing, the elongated housing mechanically connected to the main light head at the first end of the elongated housing; wherein the main light head is pivotally secured to a first end of the elongated housing such that the main light head can fully pivot with respect to the elongated housing independent of the at least three light panel bodies when the at least three light panel bodies are pivoted outward to their fully extended positions;
electrical circuitry/components disposed within the elongated housing;
an energy source in electrical communication with the electrical circuitry/components, the energy source disposed within the elongated housing; and
a power button accessible through the elongated housing and in communication with the electrical circuity/components.

2. The combination lighting device of claim 1 further comprising a bidirectional USB receptacle port accessible through the elongated housing, the bidirectional USB receptacle port in electrical communication with the electrical circuitry/components such that USB receptacle is adapted for receipt of a USB connection end of a cable for either (1) recharging the energy source by connecting an opposite end of the cable to a separate and independent power source; or (2) using the energy source to recharge another external electronic device by connecting the opposite end of the cable to the another external electronic device.

3. The combination lighting device of claim 1 further comprising a magnet disposed and exposed at the second end of the elongated housing opposite for securing the combination lighting device to a metallic surface to permit hands-free operation.

4. The combination lighting device of claim 1 further comprising a hook secured at the second end of the elongated housing for hanging the combination lighting device to an object to permit hands-free operation.

5. The combination lighting device of claim 1 wherein the electrical circuitry/components designed to permit the main light to be energized by itself, the plurality of light arrays energized by themselves or both the main light and the plurality of light arrays to be energized at the same time through a user pressing the power button a predetermined number of times.

6. The combination lighting device of claim 1 wherein the electrical circuitry/components designed to cause the main light and the plurality of light arrays to both flash at the same time by a user pressing and hold the power button down for a predetermined period of time.

7. The combination lighting device of claim 1 wherein a bottom end of the elongated enclosure having a larger diameter or being wider in dimension than a remaining portion of the elongated housing to form a base to allow the combination lighting device to be free standing.

8. The combination lighting device of claim 2 further comprising a second power button, the second power button used for activating and deactivating the bidirectional USB receptacle port.

9. A combination lighting device comprising,
a main light;
a main light head housing the main light;
a plurality of light arrays;
at least three light panel bodies equally spaced from one another around the main light head housing, each of the at least three light panel bodies independently and pivotally secured to the main light head housing, each of the plurality of light arrays housing within an associated one of the at least three light panel bodies, wherein when each of the at least three light panel bodies is pivoted outward to a fully extended position with respect to the main light head housing light each of the plurality of light arrays faces and emits light in the same direction as the main light housed by the main light head; an elongated housing having a first end and an opposite second end and being separate from the main light head housing, the elongated housing pivotally connected to the main light head at a the first end of the elongated housing independent of the pivot connection of the at least three light panel bodies to the main light head housing: wherein the main light head can fully pivot with respect to the elongated housing independent of the at least three light panel bodies when the at least three light panel bodies are pivoted outward to their fully extended positions;

electrical circuitry/components disposed within the elongated housing;

at least one rechargeable battery in electrical communication with the electrical circuitry/components, the at least one rechargeable battery disposed within the elongated housing;

a bidirectional USB receptacle port accessible through the elongated housing, the USB receptacle port in electrical communication with the electrical circuitry/components, the USB receptacle is adapted for receipt of a USB connection end of a cable for either (1) recharging the at least one rechargeable battery by connecting an opposite end of the cable to a separate and independent power source; or (2) using the at least one rechargeable battery to recharge another external electronic device by connecting the opposite end of the cable to the another external electronic device; and a power button accessible through the elongated housing and in communication with the electrical circuity/components;

wherein the main light serves primarily as a flashlight and the plurality of light arrays serve primarily as a work light.

10. The combination lighting device of claim 9 further comprising a magnet disposed and exposed at the second end of the elongated housing opposite the end of the elongated housing that the main light head is pivotally connected to, the magnet capable of securing the combination lighting device to a metallic surface to permit hands-free operation of the combination lighting device by a user.

11. The combination lighting device of claim 9 further comprising a hook secured at the second end of the elongated housing for hanging the combination lighting device to an object to permit hands-free operation of the combination lighting device.

12. The combination lighting device of claim 10 further comprising a hook pivotally secured at the second end of the elongated housing, wherein in an unfolded/pivoted outward position the hook is extended downward from the second end and capable of hanging the combination lighting device to an object to permit hands-free operation of the combination lighting device, wherein in a folded stowed-away position a majority of the hook is disposed within the elongated housing at the second end and surrounding a majority of the magnet and the hook is hidden from view when looking at the elongated housing from a side view when the hook is in the folded stowed-away position.

13. The combination lighting device of claim 9 wherein the electrical circuitry/components designed to permit the main light to be energized by itself, the plurality of light arrays energized by themselves or both the main light and the plurality of light arrays to be energized at the same time through a user pressing the power button a predetermined number of times and also designed to cause the main light and the plurality of light arrays to both flash at the same time by a user pressing and hold the power button down for a predetermined period of time.

14. The combination lighting device of claim 9 wherein a second end of the elongated enclosure having a larger diameter or being wider in dimension than a remaining portion of the elongated housing to form a base at the second end to allow the combination lighting device to be free standing; wherein the electrical circuitry/components and at least one rechargeable battery disposed within a non-base portion of the elongated housing and the power button is accessible through a non-base portion of the elongated housing.

15. The combination lighting device of claim 9 further comprising a second power button, the second power button used for activating and deactivating the USB receptacle port.

16. A combination lighting device comprising,
a main light;
a main light head housing the main light;
a plurality of light arrays;
at least three light panel bodies equally spaced from one another around the main light head housing, each of the at least three light panel bodies independently and pivotally secured to the main light head housing, each of the plurality of light arrays housing within an associated one of the at least three light panel bodies, wherein when each of the at least three light panel bodies is pivoted outward to a fully extended position with respect to the main light head housing light each of the plurality of light arrays faces and emits light in the same direction as the main light housed by the main light head; an elongated housing having a first end and an opposite second end and being separate from the main light head housing, the elongated housing pivotally connected to the main light head at the first end of the elongated housing independent of the pivot connection of the at least three light panel bodies to the main light head housing; wherein a second end of the elongated enclosure having a larger diameter or being wider in dimension than a remaining portion of the elongated housing to form a base at the second end to allow the combination lighting device to be free standing; wherein the main light head can fully pivot with respect to the elongated housing independent of the at least three light panel bodies when the at least three light panel bodies are pivoted outward to their fully extended positions;

electrical circuitry/components disposed within a non-base portion of the elongated housing;

at least one rechargeable battery in electrical communication with the electrical circuitry/components, the at least one rechargeable battery disposed within the non-base portion of the elongated housing;

a bidirectional USB receptacle port accessible through the elongated housing, the USB receptacle port in electrical communication with the electrical circuitry/components, the USB receptacle is adapted for receipt of a USB connection end of a cable for either (1) recharging the at least one rechargeable battery by connecting an opposite end of the cable to a separate and independent power source; or (2) using the at least one rechargeable battery to recharge another external electronic device by connecting the opposite end of the cable to the another external electronic device;

a magnet disposed within the base and exposed at the base, the magnet capable of securing the combination lighting device to a metallic surface to permit hands-free operation of the combination lighting device by a user;

a hook pivotally secured at the base, wherein in an unfolded/pivoted outward position the hook is extended downward from the base and capable of hanging the combination lighting device to an object to permit hands-free operation of the combination lighting device, wherein in a folded stowed-away position a majority of the hook is disposed within the base and surrounding a majority of the magnet and the hook is hidden from view when looking at the elongated housing from a side view when the hook is in the folded stowed-away position; and a power button accessible through a non-base portion of the elongated housing and in communication with the electrical circuitry/components;

wherein the main light serves primarily as a flashlight and the plurality of light arrays serve primarily as a work light.

17. The combination lighting device of claim 16 wherein the electrical circuitry/components designed to permit the main light to be energized by itself, the plurality of light arrays energized by themselves or both the main light and the plurality of light arrays to be energized at the same time through a user pressing the power button a predetermined number of times and also designed to cause the main light and the plurality of light arrays to both flash at the same time by a user pressing and hold the power button down for a predetermined period of time.

18. The combination lighting device of claim 16 further comprising a second power button, the second power button used for activating and deactivating the USB receptacle port.

* * * * *